United States Patent [19]
Künemund et al.

[11] Patent Number: 5,732,191
[45] Date of Patent: Mar. 24, 1998

[54] METHOD AND APPARATUS FOR RULE EVALUATION IN A FUZZY INFERENCE PROCESSOR

[75] Inventors: Thomas Künemund, München; Klaus Hentschel, Landshut, both of Germany

[73] Assignee: Siemens Aktiengesellschaft, Munich, Germany

[21] Appl. No.: 617,908

[22] PCT Filed: Sep. 14, 1994

[86] PCT No.: PCT/DE94/01059

§ 371 Date: Mar. 19, 1996

§ 102(e) Date: Mar. 19, 1996

[87] PCT Pub. No.: WO95/08796

PCT Pub. Date: Mar. 30, 1995

[30] Foreign Application Priority Data

Sep. 20, 1993 [DE] Germany ............... 43 31 899.1

[51] Int. Cl.$^6$ .................................................. G06G 7/00
[52] U.S. Cl. ...................... 395/3; 395/54; 395/61; 395/900
[58] Field of Search .................... 395/3, 61, 900, 395/54

[56] References Cited

U.S. PATENT DOCUMENTS 5,263,125  11/1993  Viot et al. .................... 395/51

FOREIGN PATENT DOCUMENTS 0 513 829  11/1992  European Pat. Off. ......... G06F 9/44

OTHER PUBLICATIONS

"Architecture of a CMOS Fuzzy Logic Controller With Optimized Memory Organization and Operator Design," Eichfeld et al., IEEE Int. Conf. on Fuzzy Systems, Mar. 8–12, 1992, pp. 1317–1323.

"A Fuzzy Inference Coprocessor Using a Flexible Active-Rule-Driven Architecture," Ikeda et al., IEEE Int. Conf. on Fuzzy Systems, Mar. 8–12, 1992, San Diego, CA, pp. 537–544.

H. Ikeda et al. "A Fuzzy Inference Coprocessor Using a Flexible Active-Rule-Driven Architecture" IEEE International Conference on Fuzzy Systems, Mar. 8–12, 1992, San Diego, CA pp. 537–544, Mar. 1992.

Primary Examiner—Tariq R. Hafiz
Assistant Examiner—Jason W. Rhodes
Attorney, Agent, or Firm—Hill, Steadman & Simpson

[57] ABSTRACT

In a process an apparatus for operating a fuzzy inference processor in which it is verified, in sequence for each input variable, whether the conditions of a number of rules are fulfilled, and in which for one input variable in each case only those conditions of rules are verified whose conditions for the preceding input variable had been met in the method and apparatus a screening device having an address memory, an address formation unit and a device control signal former operate in combination for detecting rule segment values which continue to be relevant, thereby achieving the advantage of rapid rule evaluation.

6 Claims, 5 Drawing Sheets

FIG 6

METHOD AND APPARATUS FOR RULE EVALUATION IN A FUZZY INFERENCE PROCESSOR

BACKGROUND OF THE INVENTION

1. Field of the Invention

The present invention is directed to a method and apparatus for rule evaluation in a fuzzy inference processor operating on fuzzified input values using a plurality of rules.

2. Description of the Prior Art

In the processing of fuzzified input values in a fuzzy inference processor, for the ultimate purpose of producing defuzzified output values, it is known to employ a plurality of rules. Each individual rule has a condition part defining a partial condition for each input variable as well as a consequence part having an allocation of a linguistic value for the respective output variable. The object of a rule evaluation is, in general, to verify whether the partial conditions of each rule are fulfilled for all the individual input variables and, in accordance with a respective rule, assigning a specific linguistic value to the output variables.

SUMMARY OF THE INVENTION

An object of the invention is, to provide a method and an apparatus for accelerated rule evaluation in a fuzzy inference processor.

The above object is achieved in a method and apparatus in accordance with the invention, used in a fuzzy processor operating on fuzzified input values using a plurality of rules, each rule comprising at least one rule segment and each rule segment having a rule segment word associated therewith, and each rule segment word containing linguistic values for an input variable in a condition part of the rule comprising that rule segment word, the rule segment words being stored in a knowledge base memory respectively at absolute addresses. The method and apparatus for accelerated rule evaluation identify which, if any, of the rule segments in each rule is fulfilled by each input variable. To this end, in a first step, a relative address is generated associated with a particular input variable, for subsequent use in addressing that input variable in the knowledge base memory. Also in the first step, a maximum input pointer of a preceding input variable (since, for the first input variable, no value for the "preceding" input variable exists) is set equal to a total number of the rule segment words, and the respective cells of an address memory are loaded with the relative addresses for all of the rule segment words.

In a second step, each of an input pointer and an output pointer for the address memory are set for addressing a first cell in the address memory.

In a third step, a relative address for addressing a rule word segment (referred to below as the "addressed rule word segment" is read out from the cell of the address memory currently addressed by the output pointer, and the output pointer is then incremented by one cell of the address memory.

In a fourth step, the absolute address for the addressed rule word segment is formed from its relative address, a start address, and a relative start address of the knowledge base memory.

In a fifth step, if the input variable in question fulfills at least one condition defined by the addressed rule word segment, the relative address of the addressed rule word segment is written back into the address memory in the cell currently addressed by the input pointer, and the input pointer is then incremented by one cell of the address memory.

In a sixth step, steps 2 through 5 are repeated until the output pointer reaches the value of the maximum input pointer, and the value of the maximum input pointer is then set equal to the current value of the input pointer. Also in this step, the relative address generated in the first step in incremented so as to address a next input variable.

Steps 2 through 6 are then repeated until all input variables are addressed (processed).

DESCRIPTION OF THE PREFERRED EMBODIMENTS

Figure 1:
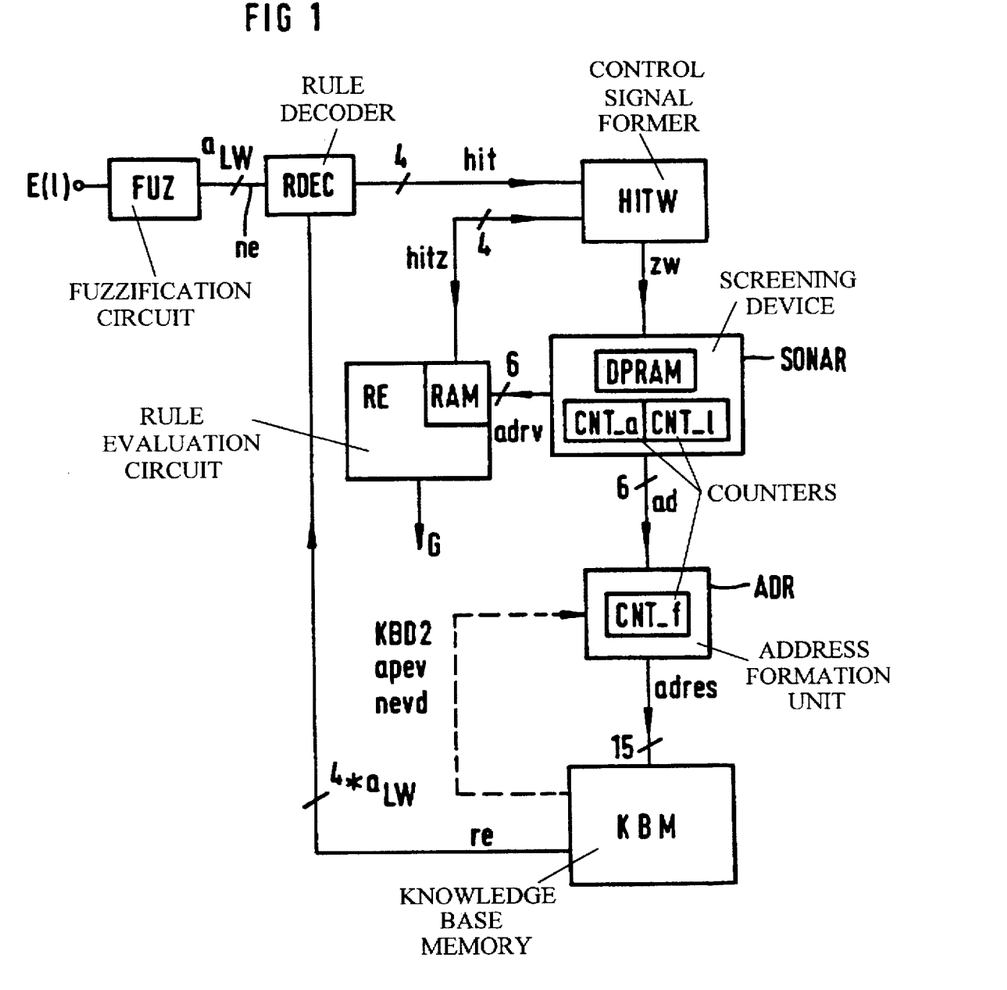
FIG. 1 is a block circuit diagram showing an apparatus for accelerated rule evaluation, constructed and operating in accordance with the principles of the present invention, in the context of other units of a fuzzy inference processor.

FIG. 1 shows a block circuit diagram which contains, in addition to a device according to the invention, a knowledge base memory KBM, a rule decoder REDEC, a rule evaluation circuit RE with a read/write memory RAM and a fuzzification circuit FUZ. The device according to the invention has a screening device SONAR (screening of not active rules) having an address memory DPRAM. Because of the low chip area requirement, the address memory DPRAM preferably is a read/write memory with a separate data output and data input (dual ported RAM), but it may alternately be, for example, an appropriately connected shift register. The screening device SONAR furthermore contains a counter CNT_a for the output pointer and a counter CNT_e for an input pointer. A relative address ad for a respective rule segment word and a delayed relative address adrv for the respective rule segment word are produced in the screening device SONAR. The delayed relative address adrv can in this case be written into the address memory DPRAM as a function of a control signal zw. If, for example as here, 64 rule segment words are provided and are to be addressed, the relative address ad and the delayed relative address adrv are in each case 6 bits wide.

In the address formation unit ADR there is a counter CNT_f for addressing the respective input variable. The addressing unit ADR contains, in addition to the relative address ad, statements such as the start address KBD2, the number apev of block segment words and the number hey of input variables, and forms therefrom the absolute address adres, which is, for example, 15 bits wide here. The start address KBD2, the number apev and the number hey originate from the knowledge base memory KBM; this relationship is indicated by a broken line in FIG. 1.

The knowledge base memory KBM, which is addressed via the absolute address adres, supplies, to the rules corresponding to the respective rule segments, numbers re for linguistic values of the input variables associated with the rule segment word.

In the rule decoder circuit RDEC, numbers ne from the fuzzification circuit FUZ are compared with the numbers re from the knowledge base memory KBM and hit signals are formed. In the example used here, four numbers re are compared at the respective resolution $a_{LW}$ in each case with the numbers ne, the numbers ne likewise having the resolution $a_{LW}$, and four one-bit wide hit signals are produced therefrom. To produce the numbers ne, active input values E(1) are fed to the fuzzification circuit FUZ. The control signal zw for the screening device SONAR is formed in the device HITW for detecting rule segment words which continue to be relevant, depending on the hit signals hit.

In a further version of the device according to the invention, the device HITW can have fed to it, in addition to the hit signals hit, hit signals hitp for previous input variables and, in addition to the control signal zw, new hit signals hitz, in which the hit signals hit are also taken into account, can be formed therefrom. The hit signals hitp of the previous input variables can in this case be read from a read/write memory and the new hit signals hitz can be written back in the memory, addressing of the read/write memory being undertaken by means of the delayed relative address adrv from the screening device SONAR being employed. Since the rule evaluation circuit RE contains a read/write memory in any case for the buffering of minima, which memory can advantageously likewise be addressed via the delayed relative address adrv, the hit signals hitz can advantageously be stored in the read/write memory RAM of the rule evaluation RE by increasing the word width, increased here by 4 bits. As an alternative to this, it would be conceivable for the hit signals hitz to be stored in a separate read/write memory and for separate addressing to be carried out.

Figure 2:
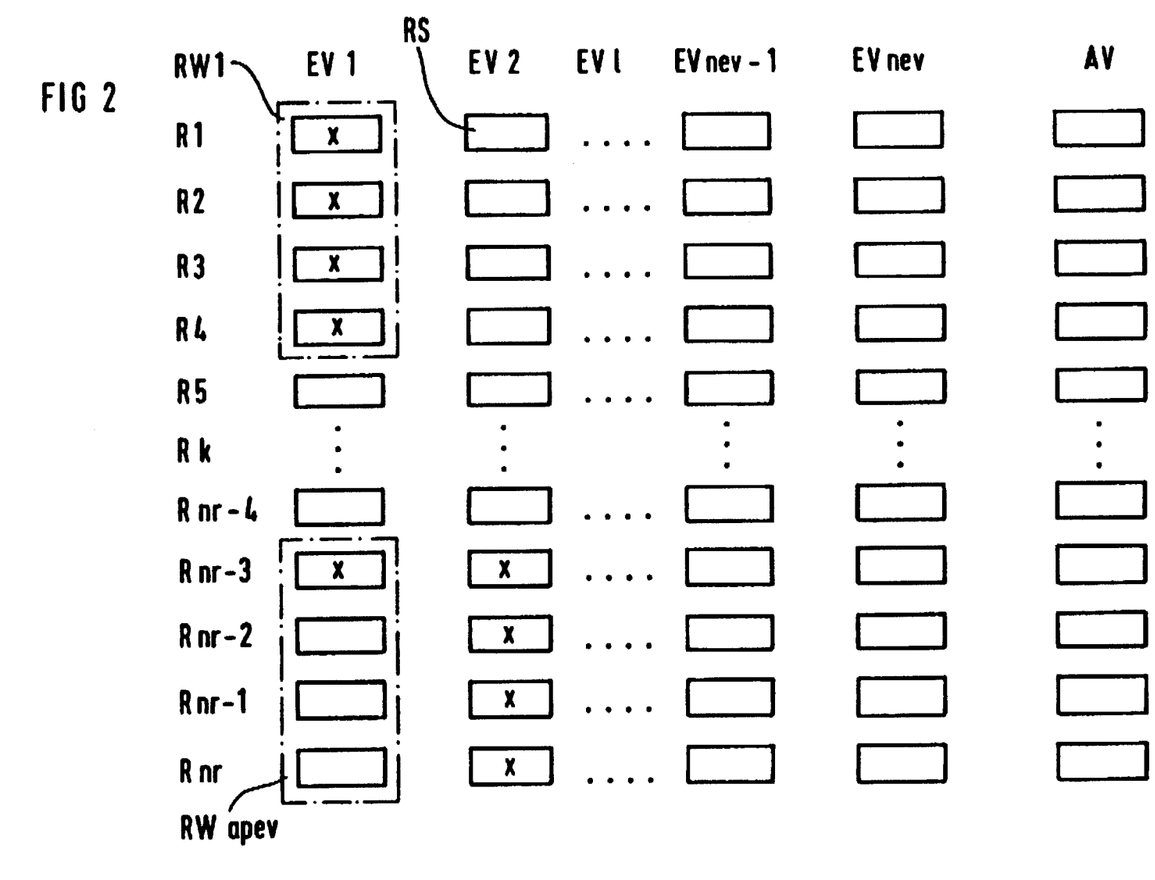
FIG. 2 is a representation showing the correlation of the plurality of rules and the plurality of input variables for explaining the method of the invention.

For the purposes of explaining the process according to the invention, FIG. 2 shows rules R1 . . . R5 . . . Rk . . . Rnr-4 . . . Rnr row by row, one rule segment RS being provided for each of the input variables EV1, EV2 . . . EV1 . . . EVnev-1, EVnev, as well as for the output variables AV. The rule segments for the input variables in this arrangement contain numbers for prescribed linguistic values of the respective input variables in the condition part of the respective rule and the rule segments for the output variables contain numbers for linguistic values of the output variables in the consequence part of the respective rule. In this case it is of essential significance for the process according to the invention that firstly all the rule segments of the input variable EV1 are processed, the rule segments which are associated with the input variable EV1 being checked to verify whether the partial conditions, defined by them, of the rules are fulfilled. If a rule segment of a rule is not fulfilled, the entire rule is not fulfilled, since all the logically ANDed input variables occurring in the condition part of a rule are represented by just one linguistic value or by just one rule segment. After all the rule segments of the input variable EV1 have been processed, a changeover is made to the next input variable EV2. In accordance with the process according to the invention, it is generally not necessary that all the rule segments of the input variables EV2 be processed but only those in which the rule segment word of the preceding input variable EV1, which in the simplest case comprises one single rule segment, was fulfilled. In the case of the input variables EV1, only those rule segments are verified in which the input variable EV1-1 . . . EV1 were all fulfilled. This is continued in a corresponding manner until the input variable EV1 corresponds to the input variables EVnev.

By way of example, in FIG. 2 the rule segments for the input variable EV1 and the rules R1 . . . R4 and Rnr-3 are identified by crosses, which mean that these rule segments are not fulfilled. In a corresponding manner, the rule segments which apply to the input variables EV2 and the rules Rnr-3 . . . Rnr are also identified as not fulfilled. If, for example, rule segment words having only one rule segment are used, the rules R1 . . . R4 and Rnr-3 are eliminated during the processing of the rules for the input variables EV2. If, however, as also illustrated in FIG. 2 by way of example, rule segments words RW1 . . . RWapev having four rule segments in each case are used, that is to say parallel processing of four rule segments takes place, the rules R1 . . . R4 can remain unconsidered during the processing of the input variables EV, since all the rule segments of the rule segment word RW1 do not apply. On the other hand the rule Rnr-3 must be taken into account during the processing of the input variable EV2, since only that rule segment specified by the input variable EV1 and the rule Rnr-3 within the rule segment word RWapev does not apply. Rule segment words having a lower number of rule segments are generally accompanied by a higher saving effect in relation to the process according to the invention.

Figure 3:
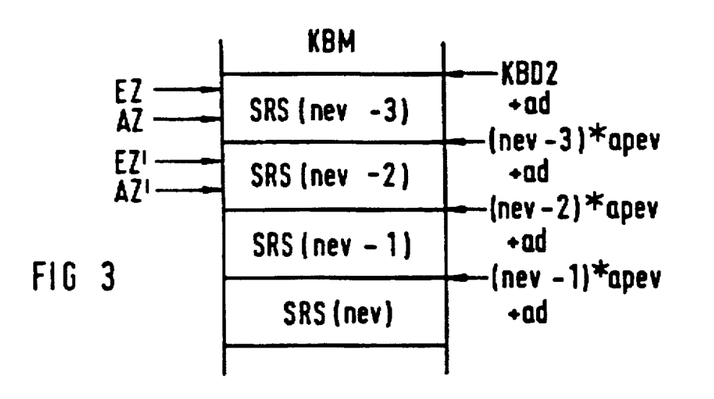
FIG. 3 illustrates the memory organization in an address memory of the apparatus of the invention.

FIG. 3 shows a detail of the knowledge base memory KBM, beginning at the start address KBD2, for nev=4. A set of rule segments SRS (nev) is shown for the input variable EV1, a set SRS (nev-1) is shown for the input variable EV2, a set of rule segments SRS (nev-2) is shown for the input variable EV3 and a set of rule segments SRS (nev-3) is shown for the input variable EV4. The start address is the beginning of the set SRS (nev-3), the beginning of the set SRS (nev-2) is defined by adding the relative address (nev-3) * apev to the starting address, the beginning of the set SRS (nev-1) is defined by adding the relative address (nev-2) * apev to the starting address and the beginning of the set SRS (nev) is defined by adding the relative address (nev-1) * apev to the start address KBD2. Addressing within the sets of rule segments is carried out by adding the respective relative address ad for addressing individual rule segment words. By way of example, an input pointer EZ and an output pointer AZ, which point to rule segment words in the set of rule segments SRS (nev-3) and pointers EZ' and AZ', which point to rule segment words in the set SRS (nev-2) are entered.

Figure 4:
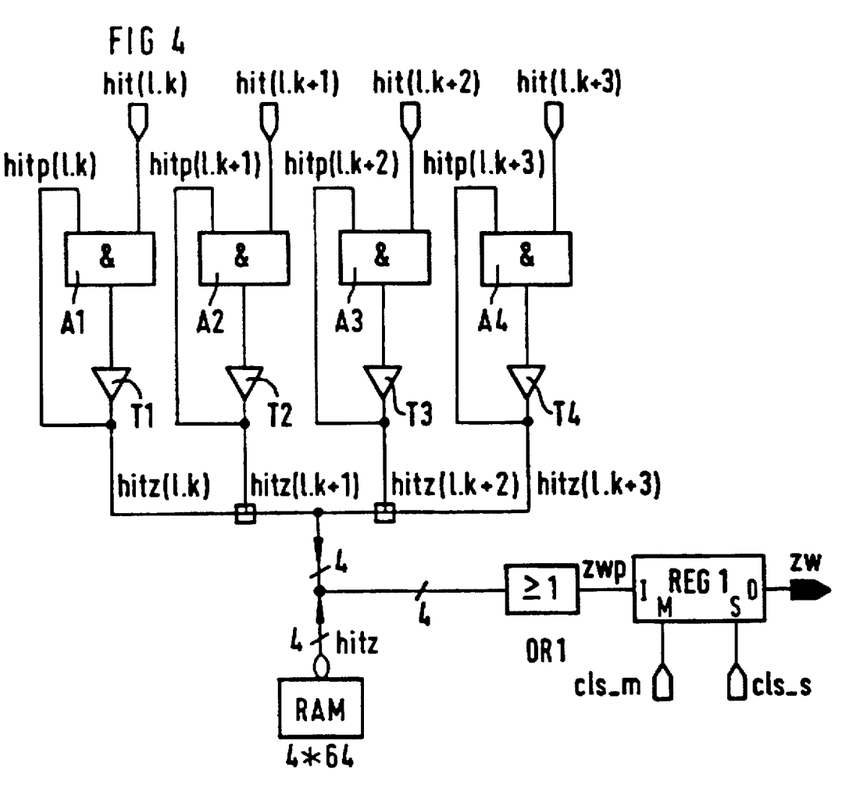
FIG. 4 shows a more detailed block diagram of the block HITW in FIG. 1.

FIG. 4 shows a detail circuit of the device HITW for detecting rule segment words which continue to be relevant, in which, for example, four hit signals hit (l, k) . . . hit (l, k+3)) are processed using hit signals hitp from the read/write memory RAM which comprises, for example, 4 * 64 bits, the control signal zw being generated. For this purpose, a hit signal hit (l, k) is fed to a first input of an AND circuit A1, the hit signal hit (l, k+1) is fed to a first input of an AND circuit A2, the hit signal hit (l, k+2) is fed to a first input of an AND circuit A3, and the hit signal hit (l, k+3) is fed to a first input of the AND circuit A4. A second input of the AND circuit A1 carries a hit signal hitp (l, k), a second input of the AND circuit A2 carries a hit signal hitp (l, k+1), a second input of the AND circuit A3 carries a hit signal hitp (l, k+2) and a second input of the AND circuit A4 carries a hit signal hitp (l, k+3). The hit signals hitp (l, k) . . . hitp (l, k+3) can he read out from the read/write memory RAM via a bidirectional data bus, can be ANDed with the hit signals hit (l, k) . . . hit (l, k+3) and, via driver circuits T1 . . . T4, can be written back as driver signal hitz (l, k) . . . hitz (l, k+3) into the read/write memory RAM. On account of the given signal conditions, no feedback or oscillation occurs and decoupling of the signals hitp and hitz by means of hold elements can be dispensed with. Since the hit signals are in each case only 1 bit wide, a minimum logic linking comprises only one AND circuit. The four 1-bit wide hit signals hitz (l, k) ... hitz (l, k+3) are linked in an OR circuit OR1 to form a signal zwp, which can be fed to an input of a register REG1, from whose output the control signal zw may be taken. The register REG1 operates according to the so-called master/slave principle, the master M receiving a clock signal cls__m and the slave S receiving a clock signal cls__s.

Figure 5:
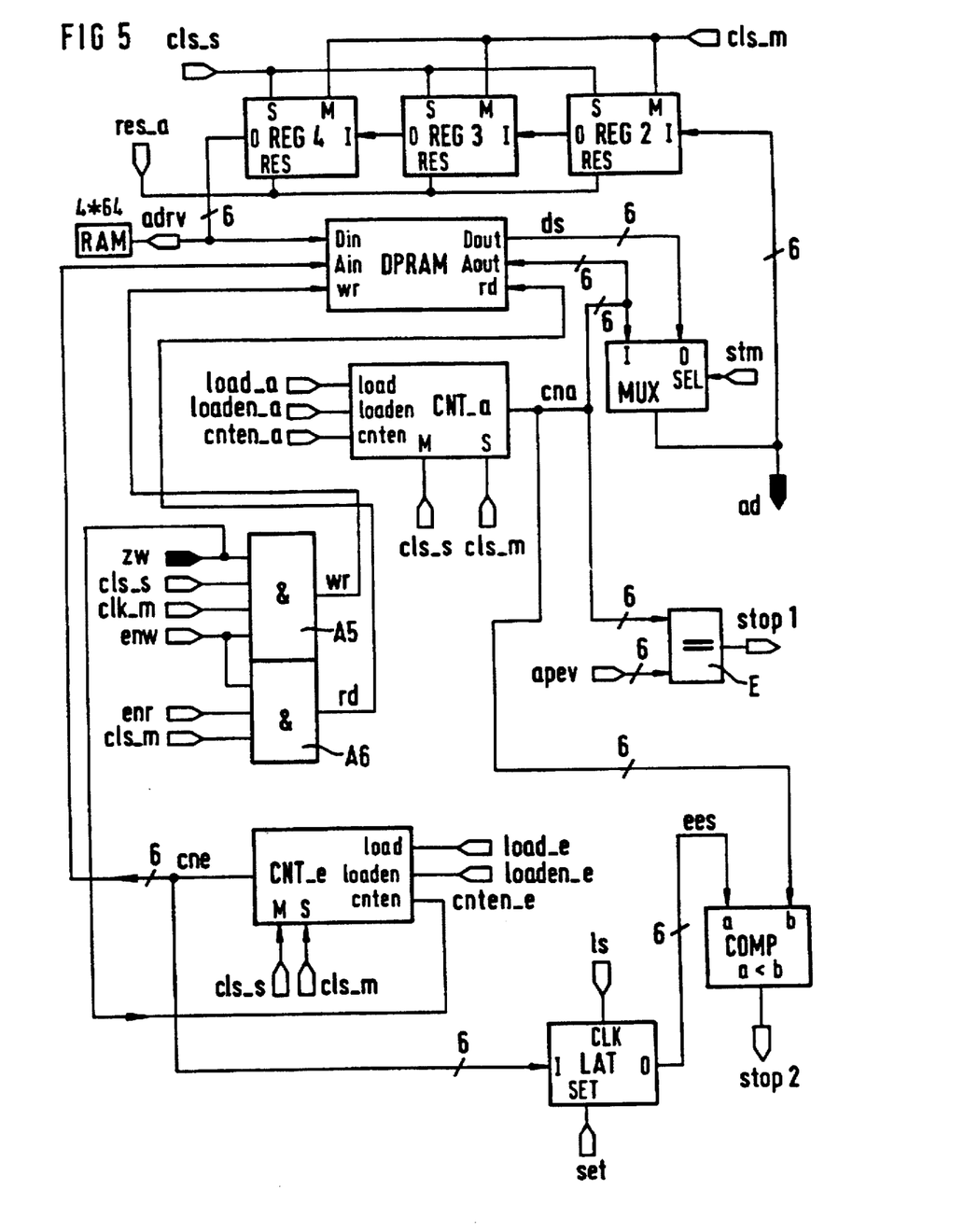
FIG. 5 is a more detailed block diagram of the block SONAR in FIG. 1.

FIG. 5 shows a detail circuit of the screening device SONAR, which has an address memory DPRAM in the form of a dual ported RAM whose data input Din receives the delayed relative address which can be formed, by three registers REG2 ... REG4 connected in series, from the relative address ad for the respective rule segment word. The input address input $A_{in}$ of the address memory DPRAM is fed an output signal cne from the counter CNT__e for the input pointer. The data output $D_{out}$ of the address memory DPRAM is connected to a zero input of a multiplexer MUX. The output address input $A_{out}$ is fed an output signal cna from the counter CNT a for the output pointer. The output signal cna is also fed to a one-input of the multiplexer MUX. The output of the multiplexer MUX carries the relative address ad for the respective rule segment word. A write signal wr, which enables the writing of the delayed relative address adrv into the address memory DPRAM, can be formed as a function of the control signal zw, the control signal zw being fed to a first input of an AND circuit A5, a clock signal cls__s being fed to a second input of the AND circuit A5, a clock signal clk__m being fed to a third input of the AND circuit A5 and a write activation signal enw being fed to a fourth input of the AND circuit A5. A read signal rd is present at the output of an AND circuit A6, whose first input can be supplied with the clock signal clk__m, a second input can be supplied with the clock signal cls__m, and a third input can be supplied with a read activation signal enr. In this arrangement, the clock signal clk__m has twice the clock frequency of the signal cls__s. The counter CNT__a operates according to the master/slave principle, can be loaded to a prescribed value load-a as soon as a load activation signal loaden__a is applied, and can count as soon as a counter activation signal cnten__a is applied. The clock input for the master carries the signal cls__s and the input for the slave S carries the clock cls__m. This applies correspondingly to the counter CNT__e, to which a load signal load__e, a load activation signal loaden__e and a counter activation signal cnten__e can be fed, the latter signal corresponding to the control signal zw. The master terminal M and the slave terminal S are connected up in the same way in the case of both counters. To generate a first stop signal stop1, an identity comparison circuit E is provided, whose first input is connected to the output of the counter CNT__a and whose second input can be fed the number apev of rule segment words for one input variable. Furthermore, the screening device SONAR has a hold element LAT, at whose input the output signal cne of the counter for the input pointer is present and whose output carries an output signal ees, to which the value for the respective last input pointer position before a change to the next input variable corresponds. The hold element LAT is clocked by a clock signal ls and can be set by a set signal set. To generate a second stop signal stop2, provision is made for a smaller-than comparator (COMP) with the comparison condition a<b, whose a-input receives the signal ees, whose b-input receives the output signal cna from the counter CNT__a for the output pointer and at whose output the second stop signal stop2=1 can be formed if a respective input variable is processed.

Depending on whether the control signal zw is equal to 1 or zw is equal to 0, the relative address ad which was necessary for reading the current rule segment word is or is not written back. This is ensured by the set or reset write signal WR. In the case of writing back, it is ensured by means of the control signal zw=1 that, at the next rising master flank, the input counter counts up by one cycle in order to address the next area of memory to be written into in the address memory DPRAM. That counter reading of the input counter which is present at the end of the processing of a set of rule segments or of an input variable is in each case written into the hold element LAT by activating the signal ls. This value serves as an end marker for the counter reading of the output counter in the subsequent cycle. The output signal ees of the hold element LAT can be fed to a last input of the smaller-than comparator COMP, on whose second input the output cna of the output counter CNA__a is present. For the condition cna<ees, the rule evaluation is located in the stage of the processing of a set of rule segments and the output signal stop2 from the smaller-than comparator COMP is zero. For the state in which stop signal stop2 is equal to 1 and stop2 is equal to 1, in all cycles apart from the first, a control mechanism is informed whether the processing of a set of rule segments has finished or not. If, on the other hand, all the rule segment words of the first input variables have been processed, the first stop signal stop1 goes to 1. The stop signal stop1 indicates the condition cna=apev is fulfilled, that is to say that the output counter has counted up to the maximum number of addressable rule segment words within one set of rule segments. It should be noted further that no access conflicts, that is to say simultaneous reading and writing at the same address, can occur in the address memory DPRAM, since, as a consequence of the control signal zw, the write signal wr only occurs with three cycles delay in relation to the relative address read out.

Figure 6:
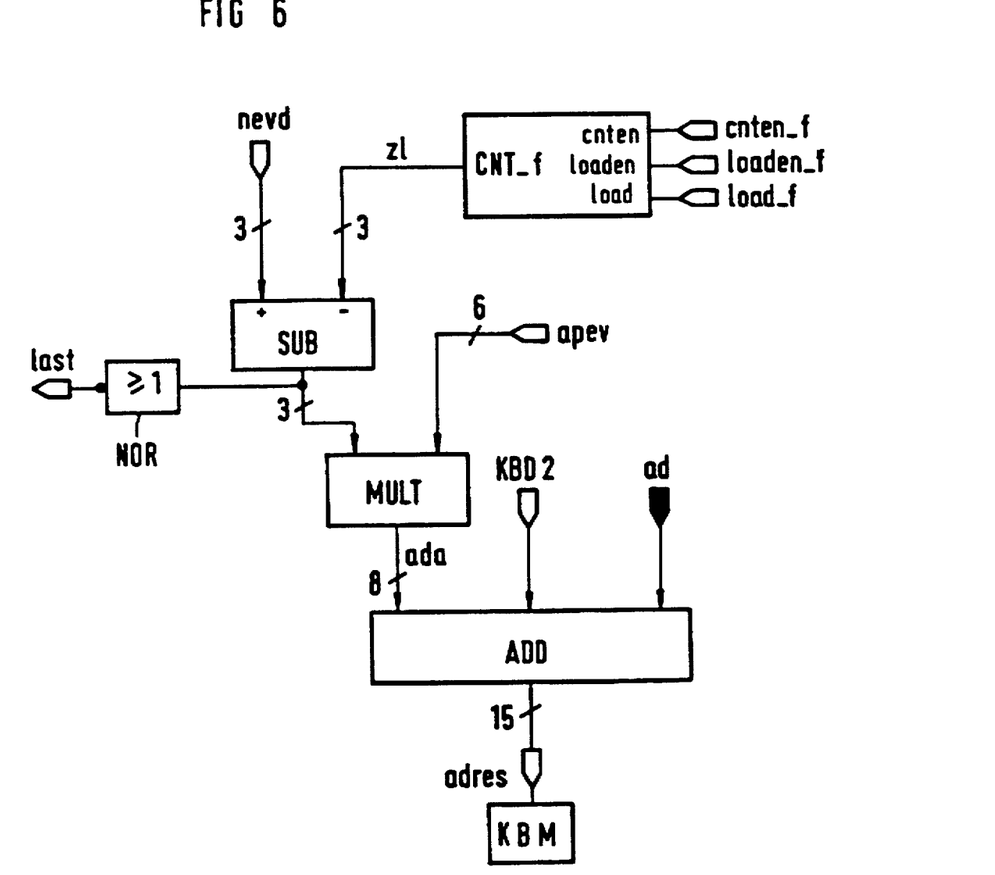
FIG. 6 is a more detailed block diagram of the block ADR in FIG. 1.

FIG. 6 shows a detail circuit of the address formation unit ADR, in which the absolute address is formed according to the following equation:

$$adres = KBD2 + (nev-1)*apev + ad$$

The address formation unit ADR contains, for this purpose, the counter CNT__f, a subtractor SUB, a multiplier MULT and an adder ADD and, optionally, a NOR circuit NOR. The counter CNT__f is, for example, a 3-bit upward counter which can be preloaded to one via a load input load__f, provided that a load activation signal loaden__f is applied, and which counts, provided that a counter activation signal cnten__f is applied. The counter CNT__f supplies at its output a signal z1 for the minus input of the subtractor SUB. The number hey of input variables is fed to the plus input of the subtractor SUB, the number nev likewise having, for example, 3 bits. The output signal from the subtractor SUB is, for example, 3 bits wide and is fed to an input of the multiplier MULT, whose further input receives, for example, a 6-bit wide signal for the number apev of the rule segment words of one input variable. At the output of the multiplier MULT, a relative start address ada is formed for addressing an area of memory which contains the rule segment words of the respective input variables, and this relative start address ada is fed to a first input of the adder circuit ADD, the relative address ada having, for example, a word width of 8 bits. The start address KBD2 is fed to a second input of the adder circuit and the relative address ad for addressing the respective rule segment word is fed to a third input of the adder circuit and in this case there is present at the output of the adder ADD the absolute address adres for addressing the knowledge base memory KBM, which address has, for example, a word width of 15 bits. The counter CNT__f is activated each time whenever, for each input variable, all the valid rule segment words of that respective input variable have been processed and the stop signals stop1 or stop2 have been set to one in the screening device SONAR.

The address formation unit ADR can further include a NOR circuit NOR, with which the output signal of the subtraction circuit SUB can be logically combined bit by bit to form a signal last for determining the last input variable. In the event that the signal last is equal to 1, the stop signal stop 1 is equal to 1 or the stop signal stop2 is equal to 1, the processing of the total of nev input variables is completed.

In the case of the process according to the invention, in a first step the relative address ada for addressing the area of memory associated with the respective input variables is produced in such a way that a first input variable is addressed, a first value for a maximum input pointer position of the respective preceding input variable is set equal to the number apev of all the rule segment words RW1 . . . RWapev, since no preceding input variable exists for the first input variable, and the address memory DPRAM is loaded with relative addresses of all the rule segment words. In a subsequent second step of the process according to the invention, the input pointer EZ and the output pointer AZ are set such that in each case a first cell of the address memory, that is to say a first rule segment word of the respective input variable, is addressed. In a third step, the respective relative address ad for addressing rule segment words is read out from that memory cell of the address memory which is addressed by the output pointer and the output pointer position is then incremented by one cell of the address memory, that is to say by one rule segment word. In a fourth step, the absolute address adres of a respective rule segment word is formed from the respective relative address ad for addressing rule segment words, the start address KBD2 and the relative start address ada, one single rule segment corresponding to a linguistic value of the respective input variable in the condition part of the respective rule. In a fifth step of the process according to the invention, the respective relative address ad for addressing a respective rule segment word is only written back into that cell of the address memory which is addressed by the input pointer and then the input pointer position is only incremented by one cell of the address memory if at least one of the conditions defined by the respective addressed rule segment word for the respective input variable is fulfilled. In a sixth step, the steps 3 to 5 are repeated until the value of the output pointer has reached the value of the maximum input pointer position of the respective preceding input variable and then the respective value of the maximum input pointer position of the respective preceding input variable is set to the value of the respective last current input pointer position and the relative address ada for addressing the respective input variable is increased in such a way that the respective next input variable is addressed. The steps 2 to 6 are carried out until all nev input variables have been processed.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a fuzzy processor operating on fuzzified input values using a plurality of rules, each rule comprising at least one rule segment and each rule segment having a rule segment word associated therewith and each rule segment word containing linguistic values for an input variable in a condition part of the rule comprising that rule segment word, said rule segment words being stored in a knowledge base memory respectively at absolute addresses, a method for accelerated rule evaluation in said fuzzy processor for identifying which, if any, of rule segments in each rule is fulfilled by each input variable, said method comprising the steps of:

(a) generating a relative address for subsequent use in addressing an input variable in said knowledge base memory, setting a maximum input pointer of a preceding input variable equal to a total number of said rule segment words, and loading respective cells of an address memory with the relative addresses for all of said rule segment words;

(b) setting each of an input pointer and an output pointer for said address memory for addressing a first cell in said address memory;

(c) reading out a relative address for addressing a rule segment word, as an addressed rule segment word, from the cell of said address memory addressed by said output pointer and incrementing said output pointer by one cell of said address memory;

(d) forming the absolute address for the addressed rule segment word from its relative address, a start address and a relative start address of said knowledge base memory;

(e) if said input variable fulfills at least one condition defined by said addressed rule segment word, writing the relative address of said addressed rule segment word back into said address memory in a cell addressed by said input pointer and incrementing said input pointer by one cell of said addressed memory;

(f) repeating steps (b) through (e) until said output pointer reaches the value of said maximum input pointer and then setting the value of said maximum input pointer equal to the current value of said input pointer, and incrementing the relative address generated in step (a) to address a next input variable; and (g) repeating steps (b) through (f) until all input variables are processed.

2. In a fuzzy processor having a fuzzification unit which produces fuzzified input values, a rule decoder supplied with said fuzzified input values, a knowledge base memory containing a plurality of rules, each rule comprising at least one rule segment and each rule segment having a rule segment word associated therewith and each rule segment word containing linguistic values for an input variable in a condition part of the rule comprising that rule segment word, said rule segment words being stored in said knowledge base memory respectively at absolute addresses and said rule segment words being supplied by said knowledge base memory to said rule decoder, the improvement comprising an accelerated rule evaluation apparatus for identifying which, if any, rule segments in each rule is fulfilled by each input variable, said apparatus comprising:

screening means for generating a rule address for subsequent use in addressing an input variable in said knowledge base memory and for generating a delayed relative address corresponding to said relative address, said screening means including an address memory, a first counter for a maximum input pointer, a second counter for an input pointer for said address memory, and a third counter for an output pointer for said address memory;

control signal forming means for, for each input variable, generating a control signal supplied to said screening means for, for a first input variable, setting said maximum input pointer to a value equal to a total number of said rule segment words, for loading respective cells of said address memory with the relative addresses for all of said rule segment words, for setting each of said input pointer and said output pointer for said address memory for addressing a first cell in said address memory;

means for reading out a relative address for addressing a rule segment word, as an addressed rule segment word, from the cell of said address memory addressed by said output pointer and for incrementing said output pointer by one cell of said address memory;

address forming means for forming the absolute address for the addressed rule segment word from its relative address, a start address, and a relative start address of said knowledge base memory;

means for determining if said input variable fulfills at least one condition defined by said address rule segment word and, if so, for causing said delayed relative address to be written into said address memory in a cell addressed by said input pointer and for incrementing said input pointer by one cell of said address memory;

said control signal forming means comprising means for generating control signals for causing a relative address and a delayed relative address to be generated in said screening means for successive input variables until said output pointer reaches a value of said maximum input pointer, and for then setting said maximum input pointer equal to a current value of said input pointer, until all of said input variables are processed.

3. An apparatus as claimed in claim 2 wherein said means for forming a delayed relative address comprises a plurality of registers, and wherein said address memory comprises a dual-ported random access memory having a data input an input address input an output address input and an enabling signal input, and said screening means further comprising a multiplexer having a one input and a null input and an output, an identity comparison circuit having a first input supplied with said output pointer from said third counter, a second input supplied with a number of said rule segment words, and an output, a hold element, means for forming said enabling signal as a function of said control signal and for supplying said enabling signal to said enabling input of said random access memory for transferring said delayed relative address into said data input, said input address input of said random access memory being supplied with said input pointer from said second counter, the data output of said random access memory being connected to said null input of said multiplexer, the output address input of said random access memory being supplied with said output pointer from said third counter, and said output address input of said random access memory also being connected to said one input of said multiplexer, said multiplexer generating said relative address for a respective rule segment word at its output, said identity comparison circuit generating a first stop signal if said output pointer is equal to said number of rule segment words and supplying said first stop signal to an input of said hold element, said hold element having a further input supplied with said input pointer and said hold element having an output at which a signal identifying a value of a last input pointer before a change to a next input variable, and said screening means further comprising a comparator having first and second inputs which generates a comparator output signal if said first input is less than said second output, said first input of said comparator being connected to the output of said hold element and said second input of said comparator being supplied with said output pointer, said comparator generating a second stop signal at its output identifying that an input variable has been processed.

4. An apparatus as claimed in claim 3 wherein said address forming means comprises a fourth counter, a subtractor, a multiplier and an adder, said subtractor being supplied, as a minuend, with a total number of input variables and said fourth counter generating a fourth counter output, supplied to said subtractor as a subtrahend, a number of a current input variable being processed, said multiplier having a first input connected to an output of said subtractor and a second input supplied with said number of rule segment words and multiplying said first and second inputs to form the relative address for a rule segment word for a current input variable, said adder being supplied with said relative address of said rule segment word of said current input variable from said multiplier, and also being supplied with said start address and said relative address of said knowledge base memory and forming therefrom said absolute address at an output of said adder.

5. An apparatus as claimed in claim 4 further comprising a NOR circuit having a plurality of inputs connected to the output of said subtractor, said plurality of inputs of said NOR circuit respectively carrying individual bits of a value at the output of said subtractor and said NOR circuit generating a signal identifying that a last input variable is present.

6. An apparatus as claimed in claim 2 wherein said control signal forming means comprises an ORR circuit, a register and an AND circuit for each rule segment of a rule segment word, each AND circuit generating a hit signal for rule segments of a preceding input variable and a hit signal for a rule segment of a current input variable, for all of said rule segments up to said current input variable, said hit signals for rule segments up to said current input variable being entered into a read/write memory and, in a next cycle, being read out as hit signals of all of the preceding input variables addressed by said delayed relative address produced in said screening means, and each signal for rule segments up to said current input variable being supplied to an input of said ORR circuit and said ORR circuit having an output supplied to an input of said register, said register forming said control signal at an output of said register.

\* \* \* \* \*